Oct. 8, 1929.  C. G. WIGLEY  1,730,489
PROCESS OF DISPOSAL OF SEWAGE OR OTHER WASTE ORGANIC MATTER
Filed April 7, 1927
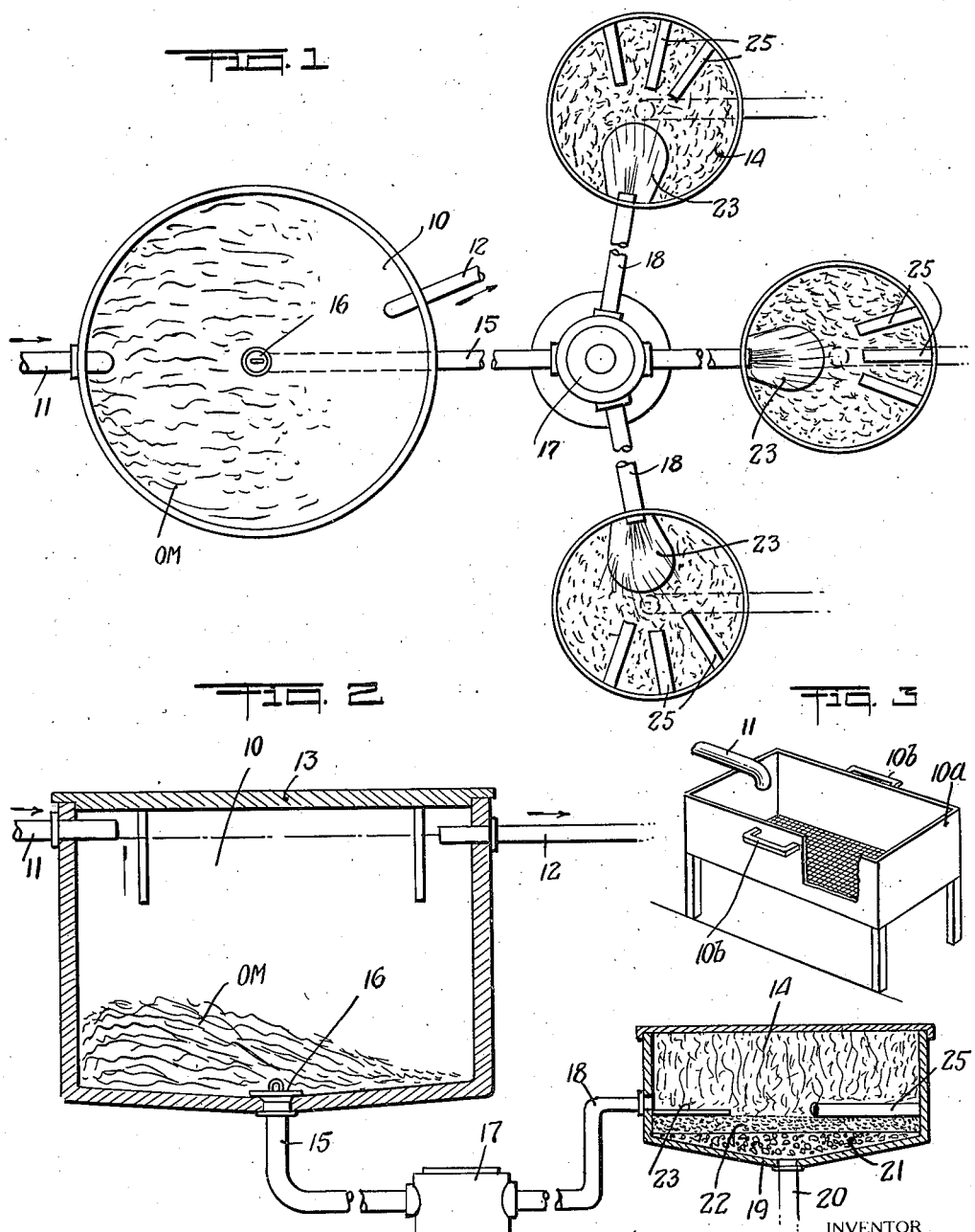

Patented Oct. 8, 1929

1,730,489

UNITED STATES PATENT OFFICE

CHESTER G. WIGLEY, OF ATLANTIC CITY, NEW JERSEY, ASSIGNOR OF ONE-HALF TO CLYDE POTTS, OF NEW YORK, N. Y.

PROCESS OF DISPOSAL OF SEWAGE OR OTHER WASTE ORGANIC MATTER

Application filed April 7, 1927. Serial No. 181,622.

This invention relates to sanitary engineering and has particular reference to the treatment and disposal of the solid organic matter found in sewage from cities, towns, other municipalities, or any of numerous other institutons or places.

According to the commonly practised experience in this country the disposal of solid organic matter from sewage requires a considerable length of time, say from two to five months, the material commonly called sludge, being in the most favorable condition a slimy pasty mass of foul nature and offensive odor and which, though eventually it may be used by truck farmers or gardeners, has a comparatively limited fertilizer value. Furthermore, because of the great length of time required for the process to be carried out, a great deal of space and money are required for the erection of the necessary tanks or receptacles and for the drying of the waste material preliminary to its being carted away for fertilizer purposes.

Among the objects of this invention, therefore, is to provide and practice a process of disposal of waste organic sewage matter or other organic waste material such as garbage, or the like, that is materially more rapid than the usual process above referred to and which accordingly may be performed in much less space and at much lower cost.

Another object of the invention is to provide a process of treating or disposing of waste organic matter that results in a product with practically no odor or an odor that is inoffensive and harmless, and which, moreover, possesses a greater fertilizer value than heretofore, especially when employed as a filler for fertilizers, because of its high nitrogen content.

A still further object of this invention is to provide a process for the treatment of waste organic matter which requires a relatively brief time for maturing it, from one to four days under optimum conditions being sufficient during extensive experiments and practice.

In the practice of this invention advantage is taken of the fact and development of some of the lower orders of plant life or organisms among which are found fungi, moulds, and yeasts, and which unless otherwise specified may be referred to hereinafter under the broad term of fungi. These organisms belong to one of two main classes of the vegetable kingdom and of which the highest orders include the trees and other flowering plants which depend for their food and development upon the activity of chlorophyl or "leaf green" for the conversion of carbon dioxide and water into carbohydrates while their roots draw from the ground certain inorganic materials. The lower vegetable types are fungi which, however, are wanting in chlorophyl, while their food consists of organic matter absorbed from their environment through a more or less complex system of net work called mycelium which grows rapidly and extends in all directions if unobstructed and assuming that the environment conditions are favorable. These lower types of vegetable life, moreover, are propagated through the spawn or mycelium and sometimes through spores or seed-like formations but which are not seeds in the sense employed in connection with the higher types of plant life.

In the further specific description of this invention reference will be made particularly to the practice thereof in a certain locality, but it is to be understood that the practice may vary to a considerable extent in other localities where the natural water conditions are different, climatic changes of temperature or the like are noticeable, and where for other reasons the species of fungi may of necessity be different, especially with respect to the means of propagation and development.

As a suggestion of apparatus or means for practising this invention reference is made to the accompanying drawings wherein similar reference characters are employed to represent similar parts in the several figures, and of which—

Figure 1 is a diagram in plan,

Fig. 2 is a vertical section thereof, and

Fig. 3 is a diagram indicating an alternative method of procedure.

Referring now more specifically to the drawings, 10 indicates a settling tank of any suitable size or construction into which the sewage is delivered through an inlet 11, this tank having an outflow at 12 at a substantial elevation above its bottom and remote from the inlet 11 whereby the bulk of the liquid portion of the sewage is free to be discharged and whence it may flow to a stream or other place of disposition, such as filterbeds or the like. Most of the solid particles of organic matter remain in the tank 10, settling to the bottom thereof, the proportion of the solid matter being usually approximately two cubic yards to one million gallons of water passing into and through the tank. This tank 10 may or may not be provided with a cover, indicated at 13, according to the location or climatic conditions.

More than one tank 10 may be provided, and for each of them are provided preferably a plurality of auxiliary tanks or drain basins or beds 14 located at any convenient place adjacent to or remote from the reception or settling tank 10.

After a sufficient accumulation of organic matter OM is received in the settling tank, it is caused to flow or is pumped or otherwise transferred therefrom through a discharge opening 15 normally closed by a valve 16 to any selected one of the tanks 14. A pump is indicated diagrammatically at 17 to cause this transfer from the primary tank to the tank 14, the passage from the pump being through a pipe 18. These tanks are called fungus tanks and each is built with an inclined or hopper shaped bottom 19 having at its lowest point an open drain 20. This bottom is covered with a bed of stones 21, sand 22, or other material constituting a substantial filter and over which is built a baffle or spatter board 23 upon which the sludge from the initial tank and pump is delivered and thereby caused to be trimmed over practically the entire bottom of the fungus tank to a depth of from one to twelve inches as a rule and indicated at S.

While the bulk of the water or moisture from the sludge S is free to drain rapidly through the outlet 20, the solid matter remains upon the filter bed and constitutes a favorable environment for the rapid growth of one or more suitable species of fungi or mould. For the propagation of this fungous growth certain conditions of light, moisture, and temperature must be observed although within a wide range of detail. For example, light should in a large measure be excluded and consequently the fungus tanks are provided with covers 24, but a moderate amount of oxygen must be provided because as a rule the lack of oxygen is fatal to the life and development of the fungi. In some seasons of the year, according to locality, warmth must be provided to stimulate suitable growth of the fungus; and there is indicated for this purpose a steam coil 25 as an illustration of suitable heating means. Moisture likewise may be added through the steam or otherwise if desired to maintain a suitable degree of dampness.

When any fungus tank is supplied with a suitable amount of sludge, it is impregnated, either naturally or by artificial means—though the latter is rarely necessary—with either the spores or mycelium of a species of fungus or plant mould that develops rapidly and spreads throughout the entire mass of sludge and which from the nature of the plant species attacks the organic matter of its environment and develops a tremendous growth, throughout the solid material deposited, and with the result that from one to three or four days, under best conditions, the sludge is reduced from a foul smelling pasty unstable consistency to a practically dry, pulverulent constistency of stable nature, without unpleasant odor, and one which is, according to analyses of some of the best agricultural schools, a fertilizer believed to be of value superior to that of the original matter OM. The impregnation referred to herein may be artificial or otherwise, but under ordinary conditions artificial impregnation will not be required because the spores or seed of the fungi will be present in the solid matter.

At the end of the period of from one to four days as aforesaid when the growth of fungus has done its work, the material is removed from the fungus tanks 14, put into bags or otherwise prepared for shipment as a fertilizer, and the tank is then refilled with sludge for a repeated operation. The fertilizer thus prepared has a consistency and appearance very similar to ordinary leaf mould as found in the timber and possesses an odor likewise quite analogous to that of leaf mould. By providing a plurality of the fungus tanks, the process may be carried on practically continuously. In the practice of this process, it is not necessary to provide or employ extensive beds for the aeration or drying of the material, a matter of tremendous importance with respect to the amount of space required for the operation. It is to be noted also that in the usual practice of sewage disposal, with the collection tanks sealed and the bacteria acting upon the sludge of an anaërobic nature, the product is not only offensive but likely to be poisonous and dangerous, whereas, according to this new process, any growth present is of the aërobic species and the product is neither offensive nor dangerous. It is to be observed further that whether the fungi utilized in this process are propagated from spawns or seed-like formations that are produced on the tops of the growth or from the mycelia, will depend upon the conditions of the climate, locality, water in the sewage, or other variable conditions.

As a variation from the process above described and illustrated, I indicate in Fig. 3 a receptacle of any suitable size or design but provided with a reticulated bottom whereby the moisture or water may be drawn off automatically and discharged to any suitable distance as over a concrete floor with suitable gutters, leaving the solid matter in a relatively dry condition, but such a condition suitable for the fungus growth or bacteriological or chemical transformations under suitable conditions of darkness, temperature, and the like. After the transformations have taken place, the cured or ripened sludge may be discharged from the containers 10ª and such containers may then be refilled from the source of supply as, for instance, the primary delivery pipe 11. These receptacles 10ª may be portable so that they may be carried from one place to another by means of handles 10ᵇ.

I wish to point out that it is to be presumed in all cases certain conditions must be provided for optimum or best results, and these conditions include the following:
1. Proper temperature.
2. Proper admission or control of air.
3. Proper moisture conditions.
4. Proper chemical content which may be varied by the admixture to the sewage of suitable chemicals or chemical compounds, such as common salt, alum, lime, or other chemicals, provided that the sewage in its natural state is deficient in any of these needed chemicals.
5. Proper control of the rays of light and especially to prevent the presence of hurtful rays.

I claim:

1. The herein described process of treating sewage which comprises the accumulation thereof in a substantially closed but aerated receptacle from which the excess moisture is drawn off, leaving the mass of solid matter spread out over the bottom of the receptacle to a suitable depth, supplying a suitable degree of heat in the presence of a moderate degree of oxygen and lack of sunlight, and finally propagating in the mass of material the rapid growth of a fungus which permeates the entire mass within a short time and transforms the foul consistency thereof into plant growth, leaving the original matter as a dry flaky or granular practically nonmalodorous material.

2. The process of reducing the solid matter contained in sewage to a stable condition by subjecting such sewage solids to the substantial exclusion of light and fresh air; in a proper temperature for the growth therein of fungi and free from a degree of moisture harmful to such growth, until a mass of fungi is developed in said solids capable of reducing said solids to a nonputrescible condition.

3. The process of reducing sewage solids to a stable condition, which consists in subjecting such solids to the converting action of fungi developed therein under forced growth conditions of warmth, dampness, stagnant atmosphere and relative absence of light, until the mass is reduced to a substantially dry, pulverulent, nonmalodorous condition.

4. The process of reducing sewage solids to a stable condition, which consists in segregating the solids from the liquids and subjecting such segregated solids to the action of rapidly growing fungi developed therein under forced growth conditions of warmth, dampness, stagnant atmosphere and substantial exclusion of light until a mass of fungi is developed in the solids capable of reducing them to a substantially non-putrescible condition.

In testimony whereof I affix my signature.
CHESTER G. WIGLEY.